United States Patent Office 3,521,028
Patented July 21, 1970

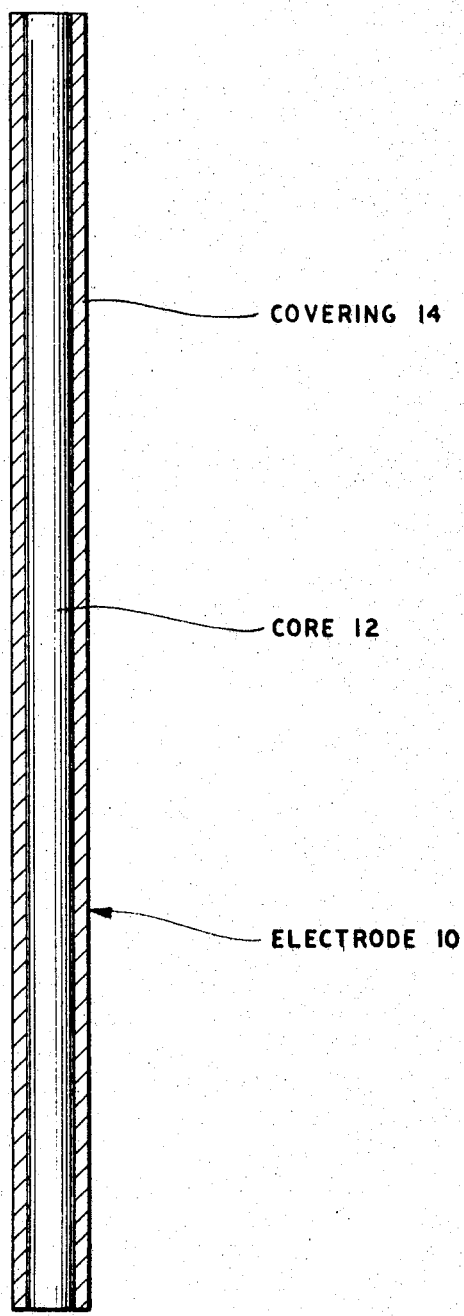

---

3,521,028
ELECTRODE FOR WELDING COPPER AND COPPER ALLOYS
Jan Wegrzyn, Ul. M Strzody 14a/14, Gliwice, Poland
Filed Sept. 13, 1967, Ser. No. 667,403
Claims priority, application Poland, Sept. 15, 1966,
P 116,478
Int. Cl. B23k 35/22
U.S. Cl. 219—146          1 Claim

ABSTRACT OF THE DISCLOSURE

A welding electrode consisting of a core of copper or copper alloy and a covering on the core consisting of 5–20% of zirconium silicate, up to 90% of lithium, sodium, potassium or aluminum compounds, such as fluorides or fluorosilicates and up to 30% of aluminum or magnesium or the like.

---

DRAWING

The sole figure is a cross-section of an electrode provided in accordance with the invention.

DETAILED DESCRIPTION

This invention relates to electrodes for the arc welding of copper and copper alloys.

The invention more particularly relates to an electrode 10, of the type including a core 12 of copper or copper alloy and a thick coating or covering 14 pressed on the core and containing arc stabilizing components which de-oxidize the weld and protect it against oxygen, bind the hydrogen and give rise to exothermic reactions.

The electrode may be used for welding copper and copper alloys by the cold method, as well as after a preliminary heating of the copper.

Copper is usually welded by oxy-acetylene welding or by argon-shielded welding techniques. By means of covered electrodes, it has thus far been possible to weld only copper parts of insignificant thickness. This has been due to the lack of suitable copper electrodes for the cold welding of sheets of substantial thickness. The first electrodes for the cold welding of thick copper parts, designed in Poland, substantially simplified the technology of welding copper but could be used only in limited scope due to the very complicated manner required for producing these electrodes and the need for packing them into an absolutely tight packing.

Owing to extensive research, an important simplification in the method of producing electrodes for welding copper by the cold method has been achieved. At the same time, the quality of the newly developed electrodes according to the invention has been improved. Moreover, electrodes provided in accordance with the invention do not need to be stored in tight packings, and the new production technique is similar to the production of standard steel electrodes.

Instead of applying double coverings, there are now provided electrodes with a single pressed covering. The properties of the double covers of known electrodes for the cold welding of copper are now combined in a single covering. This is achieved by the use of new components which have a better metallurgical physical influence than components used in the production of the hitherto used electrodes.

The main components of the covering, which ionize the arc, are compounds of zirconium such as, for example, zirconium silicate in an amount of up to 20% and preferably 5–20% by weight. Compounds of potassium and natrium are also employed.

The main components binding the hydrogen and securing the weld against oxidation are the fluorides and fluorosilicates of, for example, lithium, sodium, potassium or aluminum in an amount of up to 90% by weight.

Exothermic and metallurgical constituents are employed such as aluminum and magnesium powders in amounts of up to 30%.

The technological process of welding the copper and copper alloys by means of an electrode provided in accordance with the invention is very simple and similar to the method of welding by means of deep penetrating steel electrodes. More particularly, a high voltage arc of up to 45 v. (e.g. 8, 10 or 12 volts) renders possible the deep penetrating method of welding.

The electrode according to the invention enables the making of not only butt welds but also filled welds, these welds not requiring either hammering or heat treatment. The efficiency of welding of copper by the use of an electrode according to the invention is about 30 times as high as for gas welding. The electrode according to the invention is also adaptable for welding and over-welding of different copper alloys, with brass.

The mechanical properties of welds by electrodes according to the invention are similar to those of plastic worked copper. Also the electric and thermal conductivity is near the conductivity of copper. The metal deposited from the copper electrodes according to the invention comprises more than 99.8% Cu.

In the following Table 1, column 1 shows all the components used for the coating of the improved electrode. Column 2 shows the percentage ranges of these components. Columns 3, 4, 5, 6 and 7 show exemplary values of components of five different coatings according to the invention.

TABLE 1

| Components | Claimed limits of the components | Exemplary values of components of the coatings according to the invention | | | | |
|---|---|---|---|---|---|---|
| | | I | II | III | IV | V |
| 1 | 2 | 3 | 4 | 5 | 6 | 7 |
| Zirconium silicate | 5 up to 20% | Max. 20% | Min. 5% | Rest 9% | Max. 20% | Min. 5%. |
| Fluorides and fluorosilicates of lithium, sodium, potassium and aluminum. | Up to 90% | Min. 50% rest | Max. 90% | Max. 90% | Rest 79% | Rest 65%. |
| Metallic powders of aluminum or magnesium or their alloys. | 1 up to 30% | Max. 30% | Rest 5% | Min. 1% | Min. 1% | Max. 30%. |
| | | 100% | 100% | 100% | 100% | 100% | 100%. |

As seen in Table 1, the lowest range of the amount of fluorides or fluorosilicates in the coating of the improved electrode is 50%. As to the content of metallic powders of Al or Mg or their alloys, the range is from 1% up to 30%. An electrode with a coating containing less than 1% of metallic powder generally cannot give good welding results.

Table 2 specifies some sizes of the electrodes.

TABLE 2

| The diameter of the core (mm.) | 3.25 | 4 | 5 | 6 | 7 |
|---|---|---|---|---|---|
| The exterior diameter of the electrode (mm.) | 5.0–5.2 | 6.7–6.9 | 8.4–8.6 | 10–10.12 | 11.7–12.0 |
| The length of the electrode (mm.) | 450 | 450 | 450 | 450 | 450 |

The method of production of the electrode according to the invention is generally known and largely applied in manufacturing pressed electrodes for manual arc welding.

What is claimed is:

1. An electrode for arc welding copper and copper alloys comprising a core of a material selected from the group consisting of copper and copper alloys, and a covering on said core consisting essentially of 5–20% of zirconium silicate, 50% to 90% of a material selected from the group consisting of lithium, sodium, potassium and aluminum fluorides and fluorosilicates and 1 to 30% of powders of aluminum or magnesium or alloys thereof.

References Cited

UNITED STATES PATENTS 2,731,373  1/1956  Wasserman et al. _____ 148—26

JOSEPH V. TRUHE, Primary Examiner

L. A. ROUSE, Assistant Examiner

U.S. Cl. X.R.

219—118